US006556224B1

United States Patent
Banno

(10) Patent No.: US 6,556,224 B1
(45) Date of Patent: Apr. 29, 2003

(54) DATA DISPLAYING APPARATUS WHICH CAN EFFECTIVELY USE DATA DISPLAY SECTION OF SMALL AREA

(75) Inventor: Satoshi Banno, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/418,777

(22) Filed: Oct. 15, 1999

(30) Foreign Application Priority Data

Nov. 6, 1998 (JP) .......................................... 10-316288

(51) Int. Cl.[7] .............................. G06F 3/00; G06F 13/00
(52) U.S. Cl. ......................... 345/817; 345/819; 345/841
(58) Field of Search ................................. 345/201, 810, 345/812, 811, 817, 819, 820, 828, 841, 843, 853; 709/206; 340/7; 235/380; 379/92; 455/411, 550, 564

(56) References Cited

U.S. PATENT DOCUMENTS

| 4,766,434 A | * | 8/1988 | Matai et al. ................ 340/7.55 |
| 4,877,947 A | * | 10/1989 | Mori ........................... 235/380 |
| 5,146,217 A | * | 9/1992 | Holmes et al. ............. 340/7.55 |
| 5,349,629 A | * | 9/1994 | Kumano ..................... 379/354 |
| 5,872,521 A | * | 2/1999 | Lopatukin et al. ......... 340/7.52 |
| 6,209,104 B1 | * | 3/2001 | Jalili ........................... 340/5.8 |
| 6,260,060 B1 | * | 6/2001 | Moore ......................... 709/206 |

FOREIGN PATENT DOCUMENTS

| JP | 62257548 | 11/1987 |
| JP | 1276352 | 11/1989 |
| JP | 2-165261 | 6/1990 |
| JP | 567147 | 3/1993 |
| JP | 5113956 | 5/1993 |
| JP | 7-73181 | 3/1995 |
| JP | 86828 | 1/1996 |
| JP | 8-16349 | 1/1996 |
| JP | 8-237710 | 9/1996 |
| JP | 9-152991 | 6/1997 |

OTHER PUBLICATIONS

"How to Use Microsoft Windows NT 4 Workstation", Jacquelyn Gaveron et al., pp. 10–11, 1996.*

* cited by examiner

Primary Examiner—Dennis-Doon Chow
(74) Attorney, Agent, or Firm—Young & Thompson

(57) ABSTRACT

A data displaying apparatus includes a display section and a control section. The display section displays a data having a first portion and a second portion. The data is received through radio communication. The control section controls the display section such that the display section displays the data first portion and does not display the data second portion in an initial state.

2 Claims, 10 Drawing Sheets

Fig. 4

NORMAL DISPLAY SENTENCE

PROFILE

NAME: Yamada, Taro

TELEPHONE: HOME 03-1234-5678

ADDRESS:

⇩ A LOWER HIERARCHY SENTENCE IS GENERATED

PROFILE

NAME: Yamada, Taro

TELEPHONE: HOME 03-1234-5678

ADDRESS:

Yamada, Taro (Kanji)
⇩
Yamada, Taro (Katakana)
⇩
Yamada, Taro (Kanji)

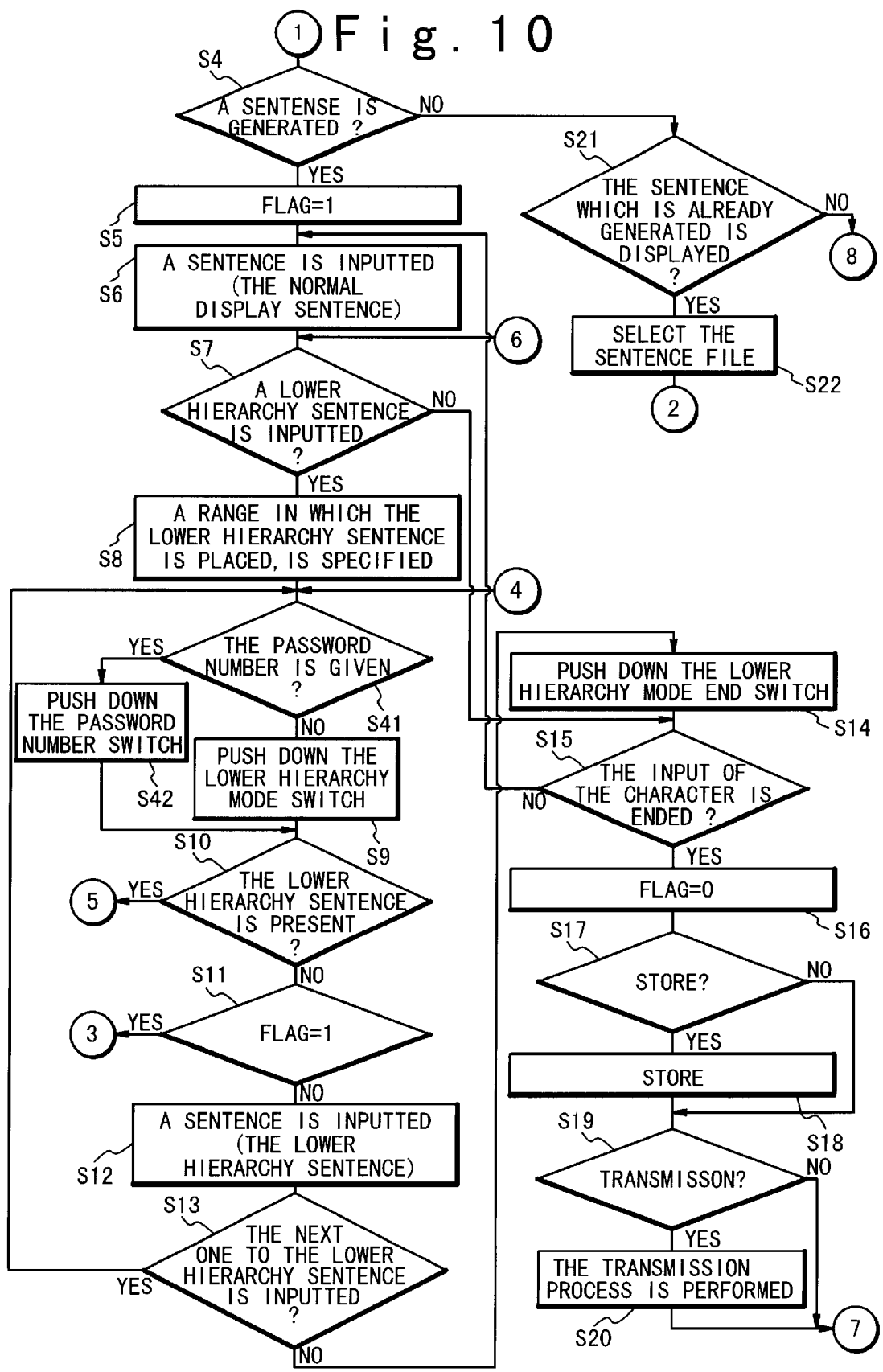

DATA DISPLAYING APPARATUS WHICH CAN EFFECTIVELY USE DATA DISPLAY SECTION OF SMALL AREA

BACKGROUND OF THE INVENTION

1. Field of the Invention

The present invention relates to a data displaying apparatus and a mobile portable information terminal apparatus. More particularly, the present invention relates to a data displaying apparatus and a mobile portable information terminal apparatus which can effectively use a data display section of a small area.

2. Description of the Related Art

Recently, a mobile portable information terminal apparatus has been popularized which can display a message sent from a transmission side on a display section on a reception side and also have a character input device and output a character inputted to the character input device to the display section.

However, if an area to display a character in the display section is small in the conventional mobile portable information terminal apparatus, even a character to be displayed is out of the display area immediately after scrolling. This reason is that a location to which the character is scrolled is limited to the upper and lower (left and right) portions outside the display area. Thereby, an originally-displayed characters must be removed from the display area to display the characters which does not be accommodated in the display area.

Also, a character message displayed in the display area is always successive. Thus, a similar information to the information displayed in the display area and information of low importance are equally displayed, which causes the display area to be unnecessarily occupied. Now, there is no device for easily displaying the character message on a display screen in very visible condition.

As a second problem, a conventional message lock is performed on the message itself. In this case, the message lock is to prohibit the message from being displayed. Thus, the lock is performed even on a section in which the lock is not requested, in the message. Hence, this is a rough locking means which displays the message as a whole or does not display it. So, there is no device for limiting a message disclosure carefully and minutely.

Japanese Laid Open Patent Application (JP-A-Heisei 8-237710) discloses an information displaying apparatus which generates a data information based on a transmission data and then displays the data information, and also does not display the data information if the data information has an information of specifying a non-display. However, this apparatus does not carry out the whole display of the data information in the transmission data, if the data information has the information of specifying the non-display. Thus, even a section in which the non-display is not requested in the data information is not displayed. Hence, this apparatus does not have the device for limiting the message disclosure carefully and minutely, as mentioned above.

Japanese Laid Open Patent Application (JP-A-Heisei 9-152991) discloses an apparatus for accessing a secret data by using a password which is easily memorized by a specified user and is not simply understood by other persons, in a data memory such as an electronic note and the like. However, any device for effectively using a display is not disclosed at all in this apparatus.

Japanese Laid Open Patent Application (JP-A-Heisei 2-165261) discloses a character processor, such as an outline processor or the like. This character processor is provided with: a document memory for storing a document composed of hierarchical document components; a specifying device for specifying a desirable document component in the document stored in the document memory; and a displaying device for displaying a document component located at a lower hierarchy than a specified hierarchy if a document component located at a higher hierarchy is specified by the specifying device. However, this apparatus is intended to effectively polish the document. Thus, the technical field of this apparatus is basically different from that of the mobile portable information terminal apparatus according to the present invention.

Japanese Laid Open Patent Application (JP-A-Heisei 7-73181) discloses a document generator which can display a system information, such as a page, a row, a column and the like, with regard to a position of a cursor, at a desirable position on a screen, in accordance with a work condition of an operator. Also in this disclosed generator, a hierarchical processor sets hierarchies for a window, a system information and the like. Accordingly, the window, the system information and the like are hierarchically displayed on the basis of the set hierarchies. However, this apparatus does not have a device for limiting the disclosure of a part of the character message data as mentioned above.

Japanese Laid Open Patent Application (JP-A-Heisei 8-16349) discloses a technique for controlling a display of a function selection menu to select a function by using a menu of a hierarchical structure. However, this technique is intended to reduce the number of operations in a pointing device which a user uses to select an item when selecting the item in turn from a higher item of the function selection menu to a lower item. Thus, this technique does not have any relation with the above-mentioned technique for effectively using the display of the small area.

The present invention is accomplished in view of the above mentioned problems. Therefore, an object of the present invention is to provide a data displaying apparatus and a mobile portable information terminal apparatus which can effectively use a small display area.

Another object of the present invention is to provide a data displaying apparatus and a mobile portable information terminal apparatus in which a message displayed on a display area is very visible.

Still another object of the present invention is to provide a data displaying apparatus and a mobile portable information terminal apparatus which can partially lock only an information which is not desired to be viewed by other persons.

SUMMARY OF THE INVENTION

The present invention has been made to solve the above-described problems of the conventional data displaying apparatus. An object of the present invention is to provide a data displaying apparatus which can effectively use a data display section of small area. Another object of the present invention is to provide a data displaying apparatus which enables the display section to be very visible.

In order to achieve an aspect of the present invention, a data displaying apparatus includes a display section displaying a data having a first portion and a second portion, the data being received through radio communication and a control section controlling the display section such that the display section displays the data first portion and does not display the data second portion in an initial state.

In this case, the control section controls the display section such that the display section displays the data second portion, in response to a display command.

Also in this case, the control section controls the display section such that the display section stops displaying the data first portion when the display section displays the data second portion.

Further in this case, when the control section receives a display command to display the data second portion, the control section judges whether or not the data second portion is displayed based on an identifier in the display command, to output one of a display allowance signal and a display rejection signal to the display section based on the judgment result, and the display section displays the data second portion when the display section inputs the display allowance signal, and does not display the data second portion when the display section inputs the display rejection signal.

In this case, the identifier is a password number to be supplied to the data displaying apparatus.

Also in this case, the data displaying apparatus further includes a data identifying section identifying the data first portion and the data second portion.

Further in this case, the data displaying apparatus further includes an input device inputting the data, wherein when the input device inputs the data, the data identifying section identifies the data first portion and the data second portion of the inputted data.

In this case, the data identifying section identifies the data first portion and the data second portion, based on at least one of a kind and an existence of a specific code given to the data.

Also in this case, a specific code is given to the data, and when the data is supplied to the data displaying apparatus, the data is divided into the data first portion and the data second portion based on the specific code.

Further in this case, the data is a message data of a plurality of character data, and the specific code is given in units of the plurality of character data.

In this case, the data has a third portion in addition to the data first portion and the data second portion, and the data first, second and third portions are provided hierarchically, and the data second portion corresponds to a lower hierarchy of the data first portion, and the date third portion corresponds to a lower hierarchy of the data second portion, and the control section controls the display section such that the display section displays each of the data first, second and third portions.

Also in this case, the control section allows the display section to display at least one of the data second portion and the data third portion based on an allowance notice.

Further in this case, the control section independently allows the display section to display each of the data second portion and the data third portion.

In this case, the data first portion is a telephone number data of a wire telephone, and the data second portion is a telephone number data of a portable telephone, and the data third portion is a telephone number data of PHS (Personal Handy-phone System).

Also in this case, the control section controls the display section such that the display section displays the data second portion based on a relation between the data first portion and the data second portion.

Further in this case, the control section controls the display section such that the display section displays a mark indicative of an existence of the data second portion when the display section does not display the data second portion.

In this case, the mark indicates a relation between the data second portion and the data first portion.

In order to achieve another aspect of the present invention, a mobile portable information terminal apparatus includes means for giving a specific code to a character message data and means for dividing the character message data into a first message data which is displayed in normal use and a second message data which is not displayed in normal use, based on the given specific code.

In order to achieve still another aspect of the present invention, a mobile portable information terminal apparatus includes an input device which when a message is generated, divides the message based on a specific code to input a plurality of the divided message data, means for arraying the plurality of divided message data hierarchically based on the specific code to form a hierarchy having a plurality of levels and means for displaying the plurality of divided message data, for each of the plurality of levels of the hierarchy.

In order to achieve yet still another aspect of the present invention, a mobile portable information terminal apparatus includes means for giving a specific code to each of a plurality of character data of a character message data and means for locking not to display each of the plurality of character data to which the specific codes are given, and allowing to be displayed the character message data other than the locked character data.

In order to achieve another aspect of the present invention, a mobile portable information terminal apparatus includes means for giving a specific code to each of a plurality of character data of a character message data, means for arraying each of the plurality of character data hierarchically, based on the specific code to form a hierarchy having a plurality of levels, means for locking not to display each of the plurality of character data, based on the specific code and means for releasing the locking such that each of the plurality of character data is displayed, wherein whether the locking or the releasing is performed is be selected in each of the plurality of levels of the hierarchy.

In the present invention, a mobile portable information terminal apparatus, which has a character inputting device and can output a character to a display, hierarchically displays a message for each header or conceals (does not display) a character that is not desired to be displayed, when a character message is displayed.

In short, this is a mobile portable information terminal apparatus, in which at a time of a first display of a message, only a header existing in the most significant hierarchy or a character message allowable to be read by an outsider is displayed. Then, the hierarchies are chased to thereby read the message or display the concealed character.

For this reason, an addition of a dedicated code to a character message data can separate into the (most significant hierarchy) message to be firstly displayed on a screen and the messages existing in a lower hierarchy except the most significant hierarchy. Then, the message without the dedicated code (a lower hierarchy sentence code) is displayed as a message to be usually displayed. Accordingly, if a position at which the lower hierarchy sentence is placed is specified, the lower hierarchy sentence is displayed in accordance with the lower hierarchy sentence code given to the message.

BRIEF DESCRIPTION OF THE DRAWINGS

A more complete understanding of the teachings of the present invention may be acquired by referring to the accompanying figures, in which like reference numbers indicate like features and wherein:

FIG. 4 is a view showing a generation example of a sentence in the first embodiment;

FIG. 10 is another part of a flowchart showing the operations of the second embodiment.

DESCRIPTION OF THE PREFERRED EMBODIMENTS

An embodiment of the present invention will be described below with reference to the attached drawings.

Figure 1:
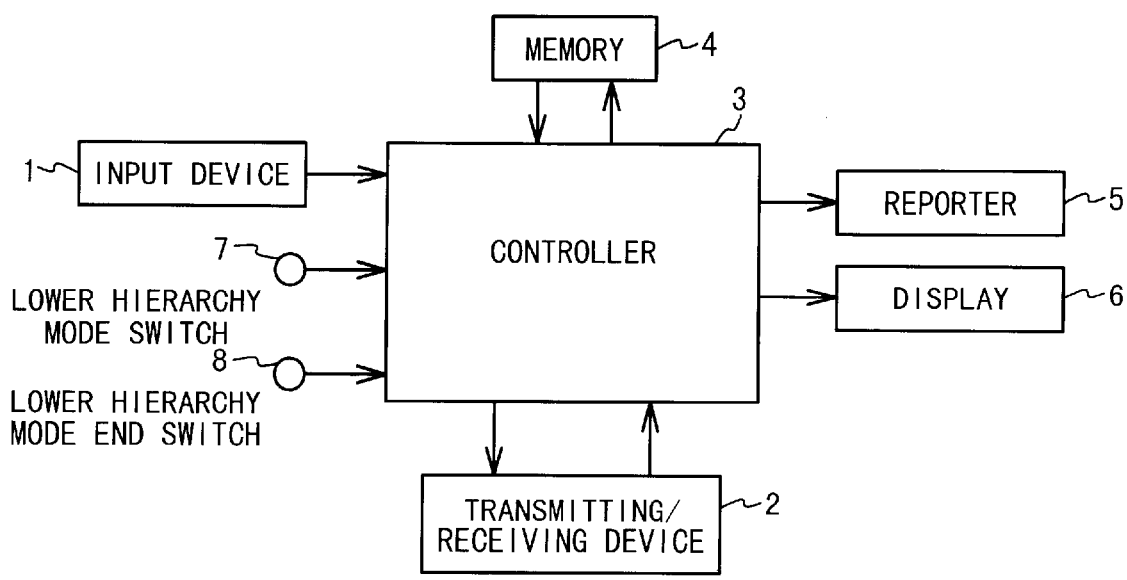
FIG. 1 is a block diagram showing the configuration of a fist embodiment of a mobile portable information terminal apparatus in the present invention.

At first, the configuration of a mobile portable information terminal apparatus in a first embodiment is described. As shown in FIG. 1, the mobile portable information terminal apparatus in this embodiment is provided with an input device 1, a transmitting/receiving device 2, a controller 3, a memory 4, a reporter 5, a display 6, a lower hierarchy mode switch 7 and a lower hierarchy mode end switch 8.

The input device 1 is a device to input a character and convert the character, such as a keyboard, a touch panel (a recognition of a handwritten character) and the like. The transmitting/receiving device 2 is a device for sending an inputted text character data to an external portion or receiving a character message data sent from the external portion.

The memory 4 is a device for storing the data inputted to the input device 1, or the data received in the transmitting/receiving device 2 or the like. The reporter 5 is a device for reporting the reception of the data from the external portion in the transmitting/receiving device 2 by using tone, vibration, light or the like.

The display 6 is a device for displaying the data inputted to the input device 1 or the reception data received in the transmitting/receiving device 2. The lower hierarchy mode switch 7 is pushed down when a data existing in a lower hierarchy is inputted or outputted.

The low hierarchy mode end switch 8 is pushed down when the data input of the lower hierarchy is ended or when the output of the lower hierarchy is ended. The controller 3 carries out the processing and the control for various operations of this mobile portable information terminal apparatus.

An operational example of this mobile portable information terminal apparatus will be described below with reference to FIGS. 2 and 3.

At first, when this mobile portable information terminal apparatus is started, initially an inner flag (Flag) of LSI inside the controller 3 is set to "0" (Step S1). If a character message is generated (NO at a step S3, and YES at a step S4, the inner flag (Flag) is set to "1" (Step S5). A character data is input to the mobile portable information terminal apparatus by using the input device 1 to thereby generate a sentence (Step S6). The sentence generated at this time is a sentence (a normal display sentence or a most significant hierarchy sentence) which is directly displayed on the display 6 when the character message is displayed. Also, the Flag is kept at "0" (NO at a step S4) except when the sentence is generated.

After the forming of the normal display sentence is completed, a lower hierarchy sentence is generated (YES at a step S7). Here, the lower hierarchy sentence implies a sentence which is not initially displayed on the display 6 when the character message is displayed. The lower hierarchy sentence is displayed (displayed instead of the normal display sentence or the most significant hierarchy sentence) only when a specific operation is performed. If the lower hierarchy sentence is not generated (NO at a step S7), the character message can be treated as the data similar to the previous case.

A procedure of generating a lower hierarchy sentence will be described below by using an example of a sentence generation of FIG. 4.

As the normal display sentence which is firstly displayed on a screen of the display 6, a sentence with regard to [PROFILE], [Name: 山田太郎] [Telephone: Home 03-1234-5678] and [Address: _____ (blank)] is generated (Step S6). In FIG. 4, [山田太郎] is Japanese kanji character indicating of "Yamada Taro".

In order to generate the lower hierarchy sentence, at first, specify a range of characters (a location) in which the lower hierarchy sentence is desired to be placed in the normal display sentence, by using the input device 1 (Step S8). In the example of FIG. 4, a range of the characters of [山田太郎] in the normal display sentence is specified (controlled by the controller 3 so that [山田太郎] is inversely displayed on the display 6), and then the lower hierarchy sentence is placed therein.

Next, the lower hierarchy mode switch 7 is pushed down (Step S9). When the lower hierarchy mode switch 7 is pushed down, the controller 3 detects whether or not the lower hierarchy sentence exists at a current position of the cursor or in a region whose range is specified (Step S10).

Since there is no existing lower hierarchy sentence in this example (NO at a step S10), the controller 3 reads a value of the Flag (Step S11). Since the sentence is being currently generated, the value of the Flag is "1", and the operation is at a lower hierarchy sentence input mode (NO at the step S11). Thus, the characters of "山田太郎" whose range is specified are cleared, and the operation becomes at a lower hierarchy sentence input wait state (Step S12).

Here, the character of [ヤマダタロウ] is inputted as the lower hierarchy sentence. If the input of the lower hierarchy sentence is completed (NO at a step S13), the low hierarchy mode end switch 8 is pushed down so that the lower hierarchy sentence input mode is passed through (Step S14). In FIG. 4, [ヤマダタロウ] is Japanese katakana character indicating of "Yamada Taro".

The normal display sentence of [山田太郎] is displayed on the display 6, instead of [ヤマダタロウ] inputted as the lower hierarchy sentence. However, an underline is drawn under the characters in which the range of [山田太郎] is specified, in order to indicate an existence of the lower hierarchy sentence.

If the next lower hierarchy sentence is inputted to a further next lower hierarchy at the same section in which the range is specified (YES at a step S13), the lower hierarchy mode switch 7 is pushed down again (Step S9). The same inputting step as the above-mentioned case is carried out. The repetition of the operations at the steps S9 to S13 enables the lower hierarchy sentence to be placed in a further lower hierarchy.

If there are a plurality of sections in which the lower hierarchy sentences are inputted to other locations, or if the generation of the normal display sentence is continued (NO at a step S15), the above-mentioned operations at the steps S6 to S15 are repeated in succession while their states are maintained.

If the generation of the sentence is completed (YES at the step S15), the controller 3 sets the value of the Flag to "0" (Step S16). If the generated message data is stored (YES at a step S17), it is stored in the memory 4 (Step S18). If it is sent to the external portion, a transmission process is performed by the transmitting/receiving device 2, and after that, the external transmission is carried out (YES at a step S19, Step S20).

Figure 5:
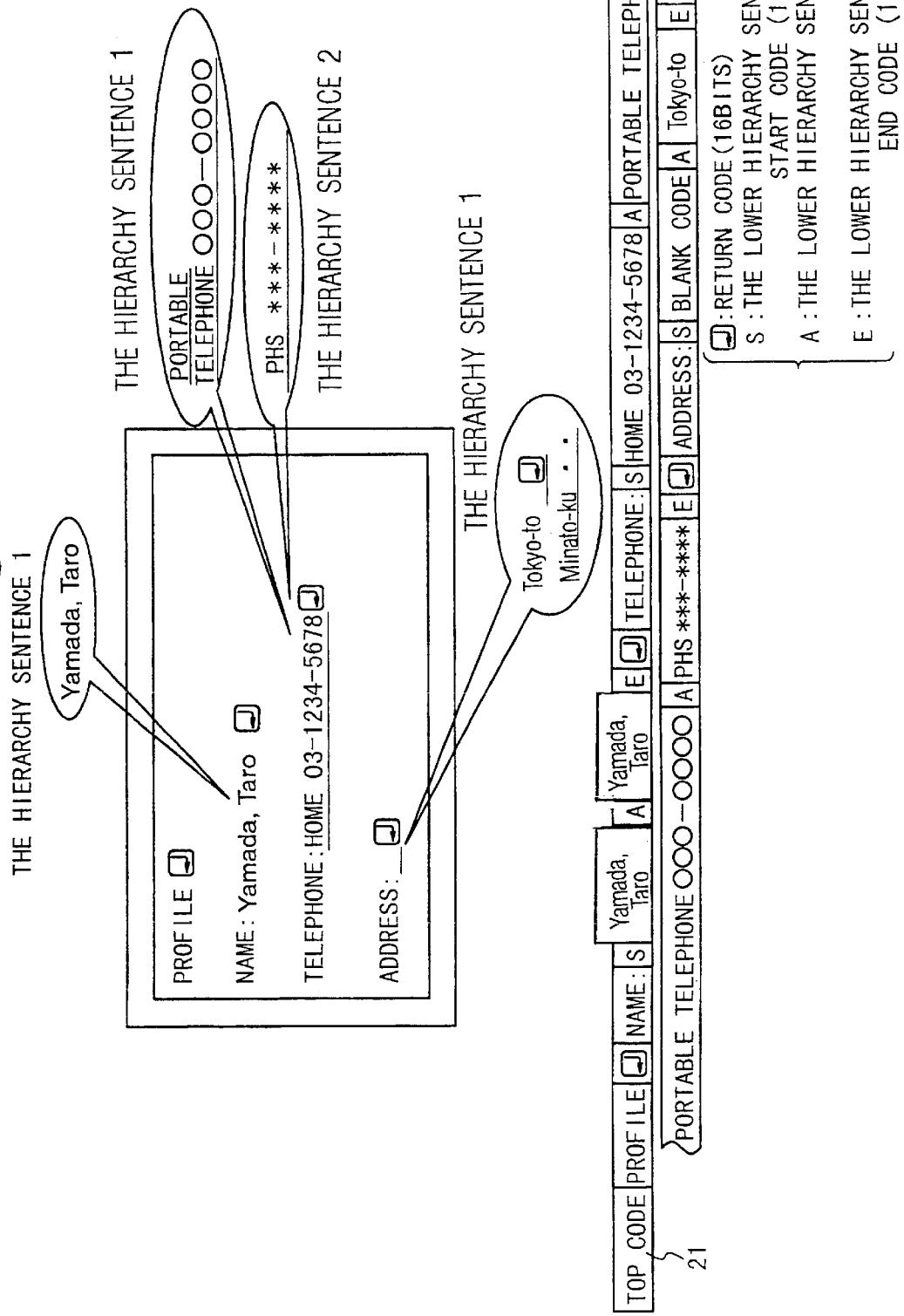
FIG. 5 is a view showing the data structure of data inputted to the first embodiment.

The data configuration of the message data including the lower hierarchy sentence is as shown in FIG. 5, for example.

A top code 21 and an end code 22 of respectively representing a beginning and an end of data are provided at the beginning and the end of the data. As for a message portion of the data, a lower hierarchy sentence start code S indicative of an addition of a lower hierarchy sentence is provided at a lead of a normal display sentence data (here, "山田太郎", "HOME 03-1234-5678" and "_____(the blank of the column for the address in FIG. 5)") combined with the lower hierarchy sentence.

A lower hierarchy sentence code A is provided at a lead of a lower hierarchy sentence (here, "ヤマダタロウ", "PORTABLE TELEPHONE ○○○-○○○○", "PHS *-" and "東京都 . . ." In this case, [東京都] is Japanese kanji character indicating of "TOKYOTO". A lower hierarchy sentence end code E is provided at a tail of a final lower hierarchy sentence (here, "ヤマダタロウ", "PHS *-****" and "東京都 . . ."

As for the lower hierarchy sentence start code S and the lower hierarchy sentence code A, when the lower hierarchy mode switch 7 is pushed down (Step S9 at the time of Flag=1), the controller 3 detects that the lower hierarchy mode switch 7 is pushed down to give the lower hierarchy sentence start code S to a lead of a range specification character (here, "山田太郎", "HOME 03-1234-5678" and "_____(the blank of the column for the address in FIG. 5)"), and also give the lower hierarchy sentence code A to the lead of the lower hierarchy sentence. In succession to the lower hierarchy sentence code A, the lower hierarchy sentence is inputted.

After the lower hierarchy sentence (for example, a lower hierarchy sentence 1) is inputted, the lower hierarchy mode switch 7 is pushed down in order to input the lower hierarchy sentence to a further next lower hierarchy (YES at the step S13, and at the step S9). Then, the lower hierarchy sentence code A is given to the tail of the lower hierarchy sentence (the lower hierarchy sentence 1 in this example). In succession to the lower hierarchy sentence code A, the next lower hierarchy sentence is inputted.

As for the lower hierarchy sentence end code E, when the low hierarchy mode end switch 8 is pushed down (Step S14), the controller 3 detects that the low hierarchy mode end switch 8 is pushed down to write the lower hierarchy sentence end code E to the data. As for the underline indicative of the existence of the lower hierarchy sentence on the normal display screen (refer to FIG. 5), when the lower hierarchy sentence start code S and the lower hierarchy sentence end code E are detected to then display the data between the lower hierarchy sentence start code S and the lower hierarchy sentence end code E, the underline is displayed on the character corresponding to the data.

Figure 2:
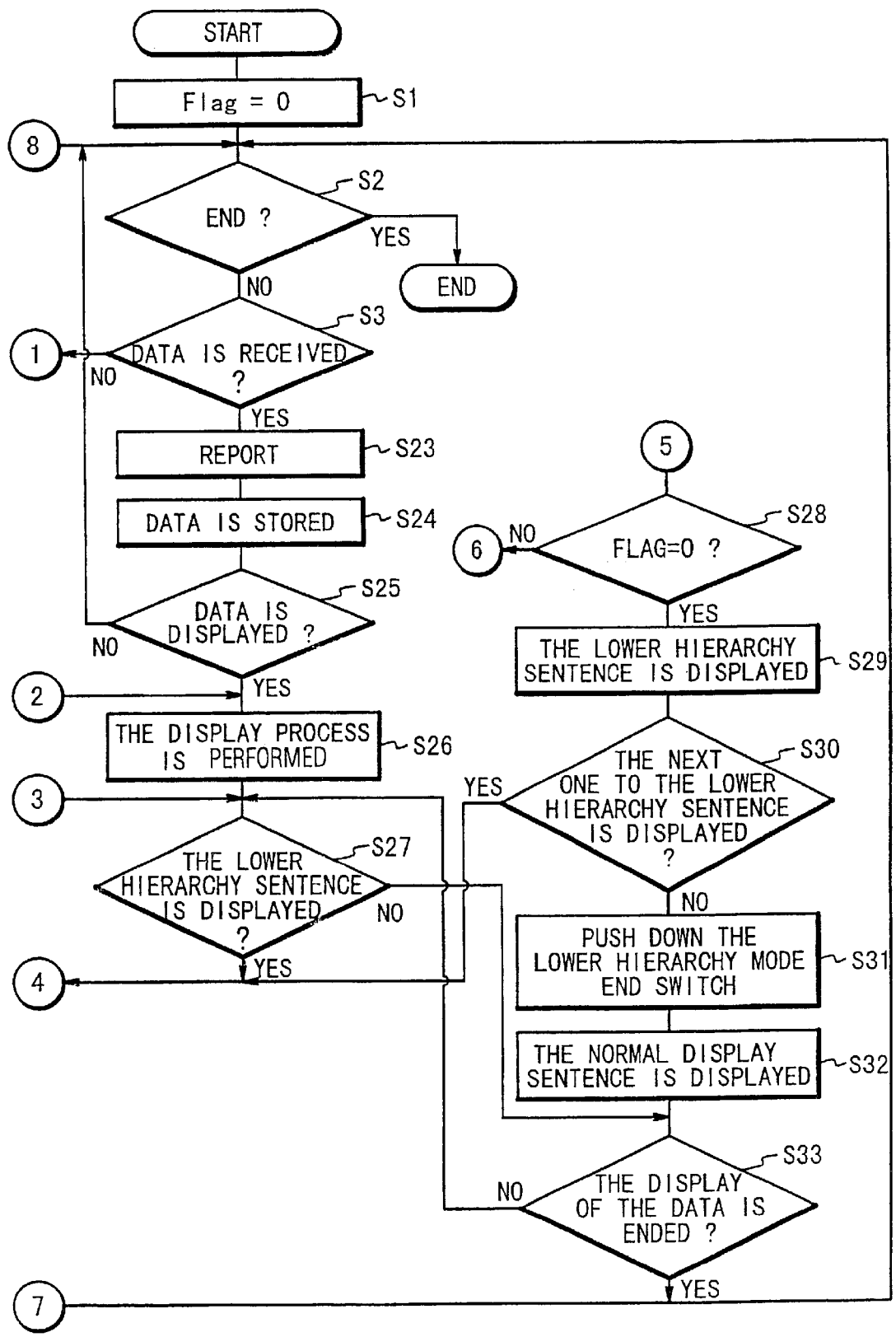
FIG. 2 is a part of a flowchart showing the operations of the first embodiment.
Figure 3:
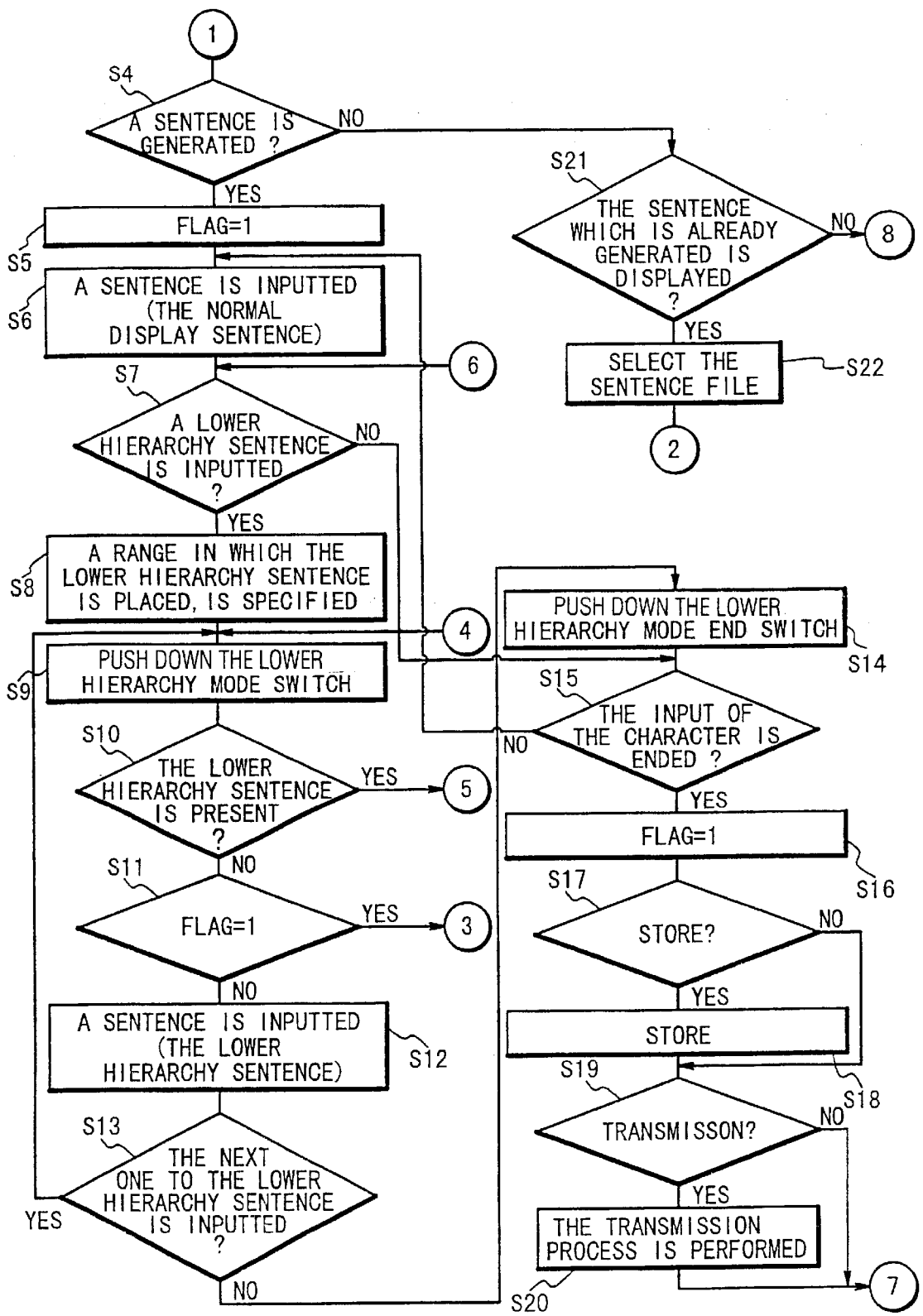
FIG. 3 is another part of a flowchart showing the operations of the first embodiment.

As shown in FIGS. 2 and 3, if the message data is received by the transmitting/receiving device 2 (YES at the step S3), the reporter 5 drives a drive device of tone, light, vibration and the like, to report the reception of the message data (Step S23). The received data is stored in the memory 4 (Step S24).

If the received message data is not read, the operational flow returns back to a reception wait state (NO at a step S25). The received message data is immediately read (YES at the step S25), the received message data is displayed on the display 6 (Step S26).

At this time, the sentence displayed on the screen of the display 6 is the normal display sentence. If the underlined portion indicative of the existence of the lower hierarchy sentence is represented in thee message data sentence(the normal display sentence), the cursor is moved to the underlined portion, and then the lower hierarchy mode switch 7 is pushed down (YES at a step S27, and the step S9).

When the lower hierarchy mode switch 7 is pushed down, the controller 3 judges whether or not the underline is drawn in the cursor position of the display 6 (Step S10). If the underline is drawn as the result of the judgment (YES at the step S10), since the Flag value is "0" (YES at a step S28) (since the sentence is not being currently generated), the controller 3 detects a lower hierarchy sentence code A which firstly appears (when there are a plurality of lower hierarchy sentences) after the normal display sentence on the underline is cleared. Accordingly, the lower hierarchy sentence (the lower hierarchy sentence 1) existing therein is displayed (Step S29).

On the other hand, when the lower hierarchy mode switch 7 is pushed down, if it is judged as the judged result that the underline is not drawn in the cursor position (NO at the steps S9 and S10), since now the Flag value is "0", an indication of a concealment mode becomes ineffective (YES at the step S11).

If the lower hierarchy mode switch 7 is again pushed down at the position in which the lower hierarchy sentence is displayed (YES at a step S30, and the step S9), it is judged whether or not still another lower hierarchy sentence is inputted to the lower hierarchy at the position (Step S10). If it is judged as the judged result that there is still another lower hierarchy sentence (if a next lower hierarchy sentence code A is detected), the lower hierarchy sentence is displayed. If there is no lower hierarchy sentence (if the lower hierarchy sentence end code E is detected), the most significant lower hierarchy sentence (the lower hierarchy sentence to be firstly displayed) is again displayed (YES at the step S10, and YES at the step S28, and the step S29).

Figure 6:
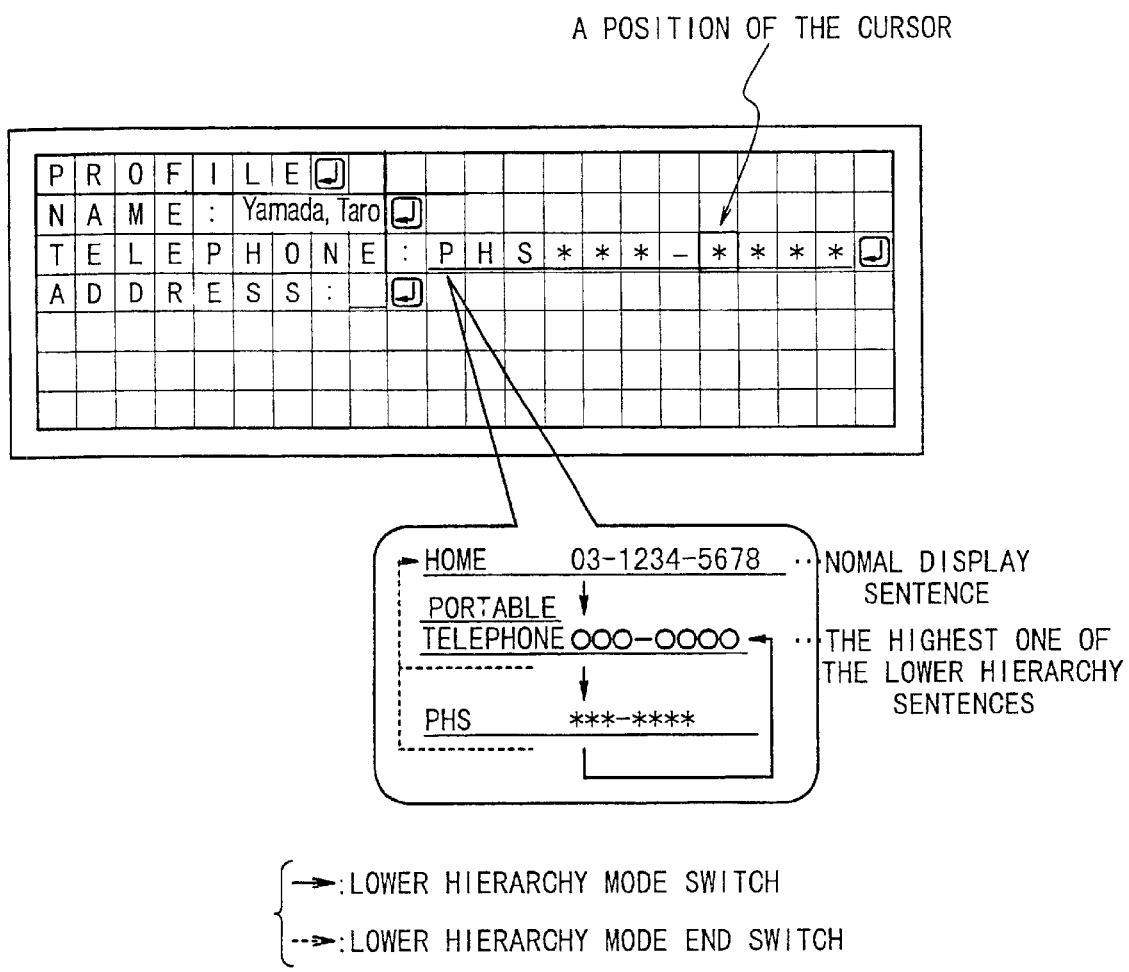
FIG. 6 is a view showing a display example of the data in the first embodiment.

An example of FIG. 6 is described. At first, a position of the cursor is moved up to an underline indication portion (a telephone number indication portion) at which a lower hierarchy sentence is desired to be displayed. And then the lower hierarchy mode switch 7 is pushed down. Accordingly, each time the lower hierarchy mode switch 7 is pushed down, the lower hierarchy sentence placed at that position is displayed by turns (alternately).

If the lower hierarchy sentence display mode is passed through (NO at a step S30), the low hierarchy mode end switch 8 is pushed down (Step S31). On the display 6, the lower hierarchy sentence is cleared, and the normal display sentence is displayed (Step S32, "HOME TELEPHONE NUMBER" in the example of FIG. 6).

If another lower hierarchy sentence at a different section is displayed (NO at a step S33), the cursor is moved up to the different section, and the above-mentioned operations are repeated (on and after at the step S27).

If a sentence is not generated (NO at the step S4) and then a character message data which is already generated or received is read out from the memory 4 (YES at the step S21, and at the step S22), the operations are carried out similarly to those of the above-mentioned message data (on and after the step S26).

The effects of this embodiment will be described below. Even in a long sentence message having a plurality of contents, the display of the screen is very visible and easy to understand the whole content of the message.

This reason lies in the installation of the device described below. That is, this device displays only the header and the point with regard to the characters to be firstly displayed on the screen. This device does not display the other detailed message. This device correlates the other detailed message with the portion to be firstly displayed on the screen as the lower hierarchy sentence message of the related header to the other detailed message. This device accordingly displays it later and individually.

The display area can be effectively used even in the mobile portable information terminal apparatus having only the display in which the display area is small.

This reason lies in the installation of the device in which the same kind of information and the similar information are represented by one character or one information and they are collectively displayed, which does not require the enumeration of the same kind of messages and the similar messages.

A second embodiment in the present invention will be described below with reference to FIGS. 7 to 10.

Figure 7:
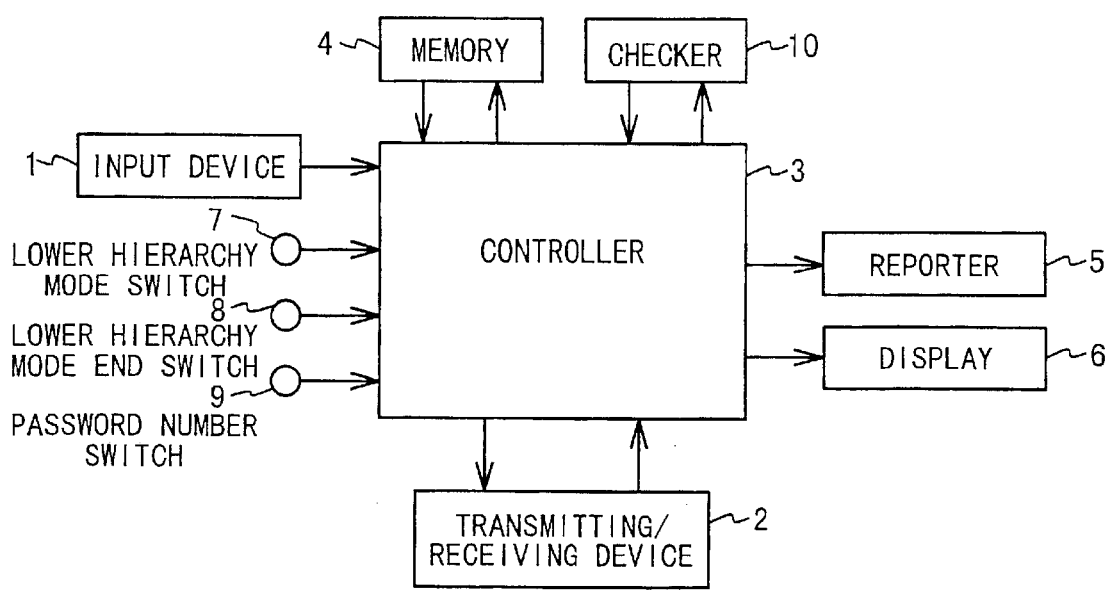
FIG. 7 is a block diagram showing the configuration of a second embodiment of the present invention.

The basic part of the configuration shown in FIG. 7 is similar to that of the above-mentioned first embodiment. The difference from the first embodiment is the installation of a password number switch 9 and a checker 10. The password number switch 9 is intended to input a password number. The checker 10 is a device for checking a password number inputted by the input device 1 against a password number registered in advance in this mobile portable information terminal apparatus.

Figure 8:
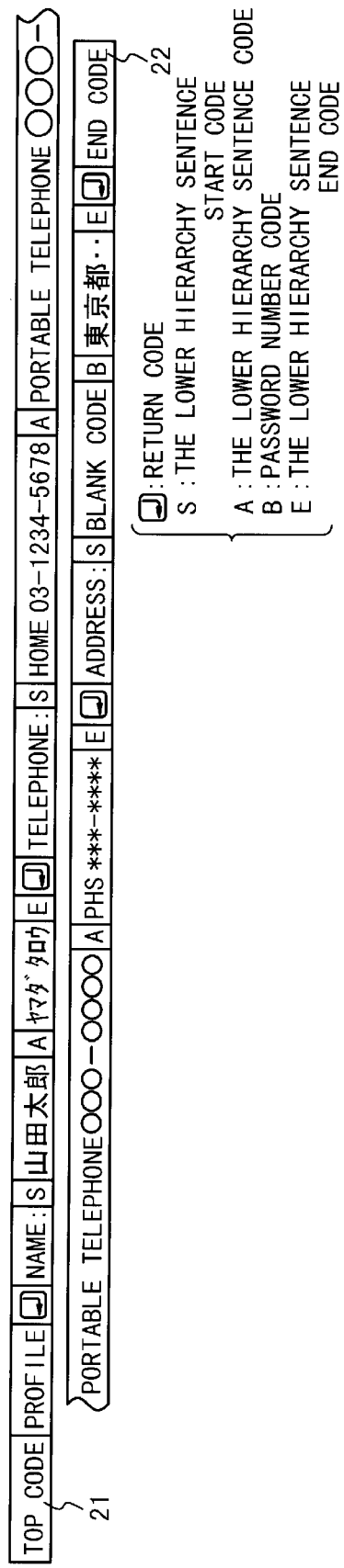
FIG. 8 is a view showing the data structure of data inputted to the second embodiment.

FIG. 8 shows an example of a data configuration of a character message data.

The basic configuration is similar to that of the first embodiment. However, only a part of a lower hierarchy sentence code is different.

In the first embodiment, the lower hierarchy sentence code is only one kind of a code "A" shown in an example of FIG. 8. However, in a case of the second embodiment, a code "B" is newly prepared in addition to the code "A". The code "B" is used for inputting a password number.

In the second embodiment, at first a password number is inputted in the input device 1 and is stored in the memory 4. For example, assuming that the password number is a four-digit numeral, the password number is inputted in a manner of "0123" by the input device 1 to be stored in the memory 4 as "0123".

The operations will be described below with the input data of FIG. 8 as an example.

An example of a normal display sentence is identical to that of FIG. 5 in the case of the first embodiment. In the first embodiment, as shown in FIGS. 2 and 3, the blank character is inputted (YES at the step S7) next to the character of [ADDRESS:] in order to display the address as the lower hierarchy sentence, when the message sentence is generated (YES at the step S4). Then, in the state that the range of the blank is specified (Step S8), the lower hierarchy mode switch 7 is pushed down (Step S9) to give the lower hierarchy sentence start code S and the lower hierarchy sentence code A before and after the blank character to then input the lower hierarchy sentence ("東京都 . . . ") (Step S12).

Figure 9:
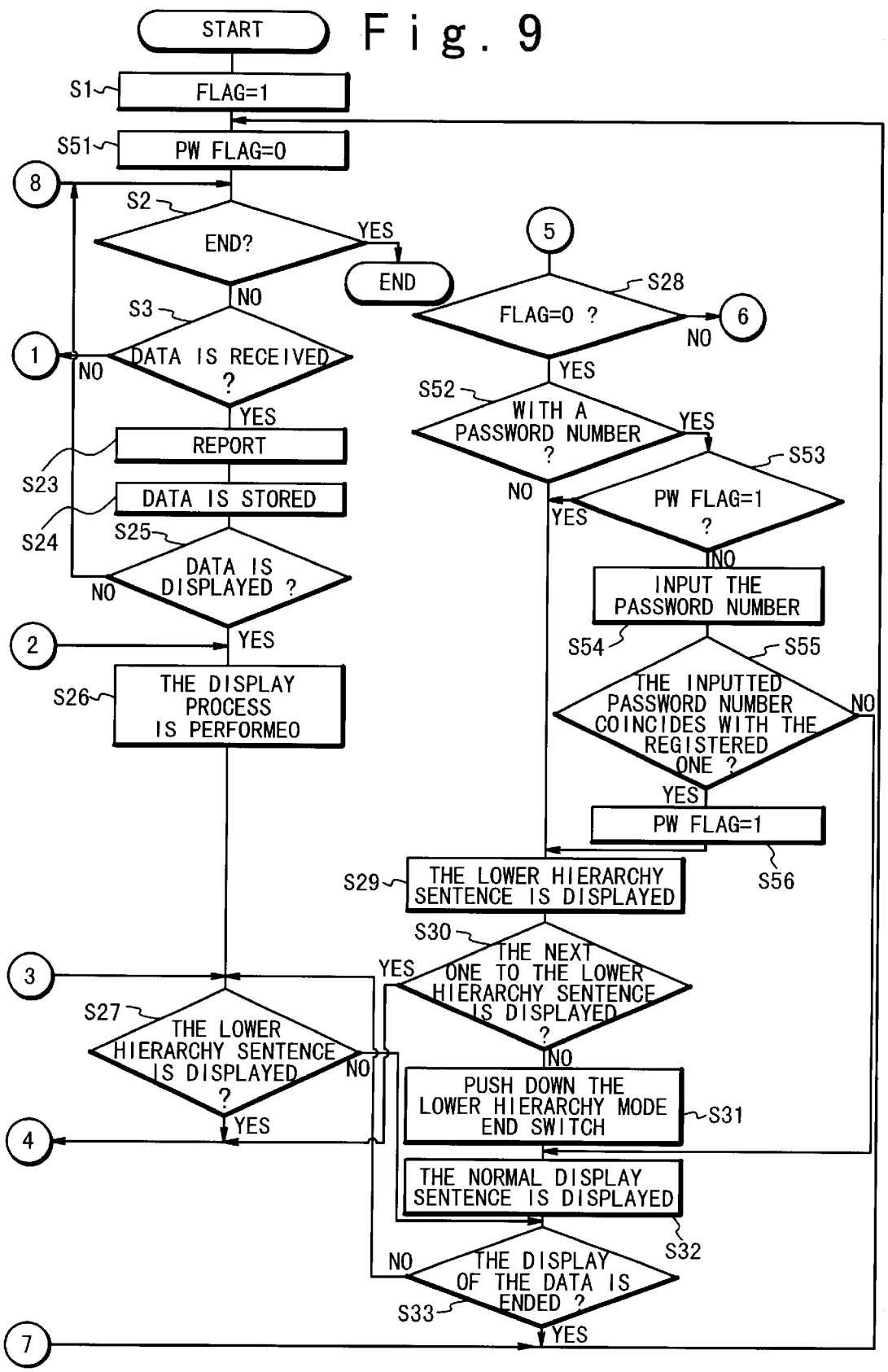
FIG. 9 is a part of a flowchart showing the operations of the second embodiment.

On the contrary, in the second embodiment, as shown in FIGS. 9 and 10, the password number switch 9 is pushed down instead of the lower hierarchy mode switch 7 (YES at a step S41, and a step S42), after the range specification of the blank character (Step S8). Accordingly, the inner Flag of the controller 3 is "1" at this time (NO at the step S11, since the sentence is being generated), and thus, a password number code B instead of the lower hierarchy sentence code A is given to the tail of the blank character. As for the lower hierarchy sentence start code S at a lead of the blank character, it is given similarly to the first embodiment. In short, it is designed that the password number code B is written to the message data by pushing down the password number switch 9. A procedure of generating the other messages is identical to that of the first embodiment.

The operations of displaying the message data to which the password number code B is written will be described below with reference to the message data of FIG. 8.

The display operations are carried out in the same procedure as the first embodiment. However, a PW flag of an initial value of "0" is newly provided (Step S51) after the step S1 of FIGS. 2 and 3, as shown in FIGS. 9 and 10.

When the lower hierarchy sentence is displayed, if the lower hierarchy sentence has the password number code B at the lead of the lower hierarchy sentence data, the controller 3 recognizes the password number code B, and accordingly controls such that the display 6 does not display the lower hierarchy sentence on the screen, and further makes the operational flow at an input wait state of a password number (YES at a step S52, and at a step S53).

The operations are actually described with reference to FIGS. 9 and 10.

On the normal display screen in which the lower hierarchy sentence is concealed, the lower hierarchy mode switch 7 is pushed down in a state that a range of the blank character next to the characters of [Address:] is specified (YES at the step S27, and YES at the steps S9 and S10). Then, the Flag is "0" (since this is under the operation of the data display and not under the operation of the character input). Thus, the operational flow proceeds to an operation of displaying the lower hierarchy sentence [東京都 . . . ] (YES at the step S28).

In this case, the lower hierarchy sentence with the password number code B is registered (YES at the step S52), and the PW flag is "0" (NO at the step S53). Thus, the indication for inputting a password number is displayed on the display 6 (Step S54).

When the password number "0123" is inputted by the input device 1 (Step S54), the checker 10 checks the password number registered in advance in the memory 4 against the inputted password number (Step S55). If they agree with each other as the checked result (YES at the step S55), the sentence of [東京都 . . . ] inputted as the lower hierarchy sentence is displayed on the display 6 to then set the PW flag to "1" (Step S56 and Step S29). If they do not agree with each other as the checked result, the operational flow returns back to the normal display screen (YES at the step S55, and the step S32).

Even if the password number code B is detected (YES at the step S52) when the lower hierarchy sentence is displayed, while the PW flag is "1" (YES at the step S53), the controller 3 ignores the detected password number code B (the operational flow skips the steps S54, S55 and S56 and proceeds to the step S29). Then, the lower hierarchy sentence is displayed on the screen without being inputted the password number. The other operations are similar to those of the first embodiment. The PW flag is set to "0" (Step S51) after the completion of the data display (YES at the step S33).

Accordingly, the individual password numbers are registered for the individual characters (items) of the character message and not for the character message itself. Thus, the disclosure limitation can be carried out in a character (item) level to thereby display the character message carefully and minutely.

It is possible to give the password number to only the information, which is not desired to be viewed by other persons, and then lock not to display it partially, in one character message.

The reason lies in the installation of the device, in which the message that is not desired to be viewed by the other persons is inputted in the lower hierarchy of the data such as the blank character, and another code (the password number code B) for the password number is prepared as the lower hierarchy sentence code, and a lower hierarchy sentence following that code is not displayed on the screen unless the pre-registered password number and the inputted number agree with each other.

In the first and second embodiments, the controller 3 controls the display 6 such that the display 6 displays the lower hierarchy sentence under (based on) the relation between the normal display sentence and the lower hierarchy sentence.

As mentioned above, according to the data displaying apparatus of the present invention, it is provided with the display for displaying the data and the controller for controlling the display. The data has the first portion and the second portion. The controller controls the display so that only the first portion of the data is displayed in the initial state. Thus, this data displaying apparatus enables the small display to be effectively used and also enables the display to be very visible.

What is claimed is:

1. A data displaying apparatus, comprising:

a receiver receiving data fields, each of the data fields including data of one type that is different from data of other types in others of the data fields, a display section displaying first and second data entries from a first one of the data fields, said display section having a first area of fixed size for displaying only one of said first and second data entries at a time; and a control section controlling said display section such that, in an initial state, said first area displays an entirety of said first data entry and does not display said second data entry, said control section further controlling said display section such that in the initial state said first area also simultaneously displays a symbol immediately adjacent to said first data entry indicative of existence of said second data entry, said control section further controlling said display section such that said display section replaces said first data entry with said second data entry in said first area upon receiving an indication that the initial state is no longer to be displayed, wherein when said control section receives a display command to display said second data entry, said control section judges whether or not said second data entry is displayed based on an identifier in said display command, to output one of a display allowance signal and a display rejection signal to said display section based on said judgment result, and said display section displays said second data entry when said display section inputs said display allowance signal, and does not display said second data entry when said display section inputs said display rejection signal.

2. A data displaying apparatus according to claim 1, wherein said identifier is a password number to be supplied to said data displaying apparatus.

* * * * *